US006153236A

United States Patent [19]
Wu et al.

[11] Patent Number: 6,153,236
[45] Date of Patent: Nov. 28, 2000

[54] LOW MELT ENCAPSULATION WITH HIGH LAURATE CANOLA OIL

[75] Inventors: Wen-Hsin Wu, Middletown; William S. Roe, Wurtsboro; Virgil G. Gimino, Highland Falls; Vimon Seriburi, Middletown, all of N.Y.; David E. Martin, Branchville, N.J.; Shaun E. Knapp, Middletown, N.Y.

[73] Assignee: Balchem Corporation, Slate Hill, N.Y.

[21] Appl. No.: 09/324,732

[22] Filed: Jun. 3, 1999

[51] Int. Cl.$^{7}$ ........................................................ A23P 1/04

[52] U.S. Cl. ................................ 426/98; 426/61; 426/99; 426/650

[58] Field of Search ................................. 426/61, 89, 98, 426/99, 105, 534, 609, 610, 601, 62, 63, 330.6, 604, 650; 435/183

[56] References Cited

U.S. PATENT DOCUMENTS 3,131,068 4/1964 Greif et al. .
3,159,585 12/1964 Evans et al. .
3,159,874 12/1964 Langer et al. .
3,247,065 4/1966 Koff et al. .
3,333,968 8/1967 Bell et al. .
3,396,037 8/1968 Bell et al. .
3,499,962 3/1970 Wurzburg et al. .
3,819,838 6/1974 Smith et al. .
3,985,913 10/1976 Johnson et al. .
4,276,312 6/1981 Merritt .
4,497,845 2/1985 Percel et al. .
4,511,584 4/1985 Percel et al. .
4,511,592 4/1985 Percel et al. .
4,537,784 8/1985 Percel et al. .
4,576,825 3/1986 Tracy et al. .
4,772,477 9/1988 Weiss et al. .
4,803,092 2/1989 Weiss et al. .
4,902,527 2/1990 Galenkamp et al. .
5,204,029 4/1993 Morgan et al. .
5,268,191 12/1993 Crosby .
5,332,595 7/1994 Gaonkar .
5,439,700 8/1995 Cain et al. .
5,607,708 3/1997 Fraser et al. .
5,736,186 4/1998 Holdren et al. .
5,750,481 5/1998 Del Vecchio et al. .

FOREIGN PATENT DOCUMENTS 0 041 303 12/1981 European Pat. Off. .
97/38588 10/1997 WIPO .

*Primary Examiner*—Keith D. Hendricks
*Attorney, Agent, or Firm*—Oblon, Spivak, McClelland, Maier & Neustadt, P.C.

[57] ABSTRACT

The present invention is an encapsulated substrate, and in particular, a substrate encapsulated with a low melt vegetable oil. The use of a low melt vegetable oil has several advantages over conventional vegetable oil products, especially when used in food systems. In one embodiment, the low melt vegetable oil is a high laurate vegetable oil, and in particular, a canola high laurate vegetable oil. In another embodiment, a food grade acid is encapsulated with a low melt oil, and the encapsulated acid is used in the manufacture of low temperature meat products such as sausage. In another embodiment, a live culture of microorganisms is encapsulated using the low melt vegetable oil.

22 Claims, 3 Drawing Sheets

| HYDROGENATED VEGETABLE OIL PRODUCTS | ONSET, °F | OFFSET, °F | DIFFERENCE BETWEEN ONSET AND OFFSET, °F |
|---|---|---|---|
| LAURICAL (HYDROGENATED) | 102.23 | 117.17 | 14.94 |
| ODYSSEY STEARINE | 39.06 | 123.48 | 84.42 |
| KAOMEL | 41.04 | 101.86 | 60.82 |
| OMEGA FLAKE | 100.4 | 129.83 | 29.43 |
| NOVOCO 100 | 58.71 | 100.65 | 41.94 |
| ASTRAL R | 70.66 | 102.68 | 32.02 |
| 120 COATING (IN-HOUSE BLEND) | 86.64 | 129.83 | 43.19 |

*FIG. 2*

LOW MELT ENCAPSULATION WITH HIGH LAURATE CANOLA OIL

FIELD OF THE INVENTION

The present invention relates to the field of encapsulation, and in particular, the invention involves the encapsulation of food ingredients and other substrates with a high laurate vegetable oil that has a low melting point and a narrow melting range.

BACKGROUND OF THE INVENTION

Encapsulation has been used in the food industry since the late 1960s, and normally involves coating a substrate or ingredient before introducing it into a food system. The combination of the coating and the ingredient is referred to as an encapsulate. Food ingredients are encapsulated for a variety of reasons, including protection of the ingredient from degradation during processing and storage, timed release of the ingredient, prevention of premature reactions, prevention of unwanted reactions catalyzed by minerals, emulsification, precise delivery of the ingredient in the food system, taste masking of vitamins and minerals, and suspension of ingredients. As a particular example, the encapsulation of salt in yeast-leavened baked goods protects the yeast from any harmful effects of the salt. As another example, encapsulating acidulants prevents the unwanted acid hydrolysis of other ingredients. Ingredients which have commonly been encapsulated include amino acids, ascorbic acid, calcium lactate, citric acid, sorbic acid, potassium sorbate, hydrocolloids, iron, lactic acid and sodium chloride. These and other encapsulated ingredients are used in a variety of food systems such as sausages, meat snacks, seasoning blends, dessert mixes, dry beverage and bakery mixes, microwaveable products and nutritional and functional food systems. Additionally, encapsulation has been used to protect biologically active materials, such as enzymes and microorganisms, against harmful substances like moisture and oxygen, and thus prolong the storage stability of these biologically active materials. The encapsulating material or coating is typically composed of a lipid or lipid mixture such as a hydrogenated vegetable oil and/or mono and diglycerides, waxes, or water soluble hydrocolloids such as gums or maltodextrins. More recently, the development of larger molecules such as cyclodextrins, which form complexes around and thereby encapsulate particles, have been used.

To accomplish the intended purposes of encapsulation, an encapsulate is designed so that its coating protects the ingredient, and thereafter at some time during the food processing cycle disintegrates and releases the ingredient into the food system. In general, the release of the substrate or ingredient from the encapsulate depends upon the melting point of the coating, the water and fat solubility of the coating, and the emulsification of the system. For lipid coatings, heat is normally used to dissolve the coating and release the encapsulated ingredient into the food system. For hydrocolloid coatings, the presence of moisture in the food system is normally the agent causing the disintegration.

An example of a fat used for a lipid coating is hydrogenated soybean oil. Fully hydrogenated soybean oil has a melting point of approximately 158° F., and an encapsulate using it would release its ingredient when the food system approaches or attains that temperature. The lipid chosen for the coating depends of course on the food system in which it will be used. The particular coating may be chosen not only based upon the temperature profile of a food process, but to allow a scientist to dictate the temperature profile of the process. For example, the scientist may choose a lipid coating which is less saturated so that high temperatures are not used solely to cause the release of an ingredient from the encapsulate. This strategy is particularly important in sausage making as will be described in detail infra. On the contrary, vitamin and mineral enrichments in baking dough would probably be coated with a high melting point fat (158° F.) so that they are protected from reaction with dough components during fermentation and most of the baking cycle, but thereafter are released in the last stages of baking so that they are available for absorption when the product is consumed. While waxes are sometimes used, for example when oxidative stability is a factor, hydrogenated oils are by far the most widely used lipid coatings.

On the other hand, hydrocolloids, such as gums, maltodextrins and modified starches are used when a predominantly water-soluble coating is desired. The ingredient is released primarily by the breakdown of the coating through its exposure to moisture in the food system, although elevated temperatures also contribute to the breakdown of such a coating. The rate of ingredient release can be controlled by the ratio of coating to ingredient. A thicker coating takes longer to dissolve, thereby releasing the ingredient later in the processing cycle.

While encapsulation has been used in the food industry for almost 30 years, prior art systems of ingredient encapsulation, while effective, have some shortcomings when the so-called "low-melt" coatings are used. First, prior art encapsulated ingredients have poor flowability characteristics, and also have a tendency to cake up and dough up. Additionally, prior art encapsulations do not exhibit a very tight seal, i.e. ingredients leach out of the encapsulate prematurely. In general, prior art coatings have broad melting ranges and higher melting points, making it difficult to deliver the proper amount of ingredient at the correct time. Specifically, a food system may not attain the conditions for the disintegration of the coating, or the conditions for breakdown may be reached at an incorrect time (either too early or too late), and the ingredient will either be released at a time where it cannot function properly or worse yet, where it has a pernicious effect on the food system. There is also the possibility that the conditions for the disintegration of the coating are not attained and the ingredient is never released into the food system. This latter possibility may be a particular problem in the processing of low temperature meats, such as winter sausages, where acid is encapsulated for later release into the meat, but where the processing temperatures never reach levels which cause the disintegration of the coating, and the ingredients are therefore never released into the meat product. If the coating does not disintegrate in the manufacture of winter sausage, the pH is not lowered and proper preservation and stabilization of the sausage is never obtained.

This slow release of acid from encapsulates allows the salt in the meat emulsion to work, i.e. to extract the salt soluble proteins and form a protein matrix, and prevents premature denaturing of the protein by a sudden drop of the pH if acid is added directly without encapsulation or a high-leach encapsulated acid is used. This matrix binds the meat particles, spices and other ingredients thereby forming the sausage prior to the acidification. The entire matrix is then denatured by the subsequent acid release from the disintegration of the encapsulate, resulting in a coagulation and precipitation of the protein structure. If the protein is denatured too rapidly, matrix formation is prevented by the precipitation of individual protein particles not initially bound into a matrix. This results in a soft mushy texture with minimal integrity.

In the production of sausage, some attempts have been made to use lower melting point oils obtained by fractionation or partial hydrogenation for the coating such as high oleic canola stearine (Cargill) and Astral R (AC Humko). However, fractionated stearines possess soft and sticky physical characteristics which do not make them suitable for encapsulation. The use of such oils therefore has been met with limited success since the oils' broad melting range and high degree of unsaturation results in poor flowability and protection of the ingredients, caking, and leaky encapsulations. Consequently, an improved encapsulate and process are needed in the food industry for low temperature processes.

A low-melt encapsulation would also be advantageous when encapsulating materials with biological activity, such as enzymes and microorganisms that are highly sensitive to temperature and moisture. It is well known among those skilled in the art that enzymes and microorganisms can be inactivated when exposed to elevated temperature (e.g. >40° C. or 104° F.), especially in combination with exposure to moisture. While encapsulation has been considered as a means to provide additional protection to these biologically active materials and thus prolong their shelflife or storage stability, certain difficulties arise with more conventional encapsulation processes and coatings as most prior art processes and coatings require a much higher temperature during the encapsulation process than tolerable by the biologically active materials.

Consequently, it is an object of the present invention to improve the quality, characterisitics, effectiveness and precision of encapsulates in the food industry.

It is another object of the present invention to develop an encapsulate that can be effectively used in low temperature food processing environs.

It is a further object of the present invention to develop such an encapsulate using a low melting point fat which is hard and dry and room temperature, and melts in a sharp and narrow range at slightly higher than room temperature.

It is a further object of the invention to develop an encapsulate which is more tightly formed than prior art encapsulates, thereby preventing premature leakage of the encapsulated material.

It is a still further object of the present invention to use a low-melt encapsulated acid in the production of low temperature meats such as winter sausage.

It is another object of the present invention to use a low melting point fat to encapsulate biologically active substrates.

The present invention accomplishes these and other objectives.

SUMMARY OF THE INVENTION

The present invention is a low melt encapsulate with a narrow melting point range, a process to manufacture such a low melt encapsulate, and the use of such a low melt encapsulate in the production of foods. In a preferred embodiment, the low melting point oil used is a high laurate vegetable oil. In another preferred embodiment, the encapsulate is made of a coating of high laurate vegetable oil in conjunction with an acid, such as lactic acid or citric acid, and it is used in the production of low temperature meats such as winter sausage. In another preferred embodiment, high laurate vegetable oil is used to encapsulate biologically active compounds.

High laurate vegetable oils contain a high percentage (>25%) of lauric acid (C12:0, dodecanoic acid) connected to the glycerol backbone of the fat and a resulting higher percentage of lauric acid by weight than found in conventional vegetable oil products. An example of a high laurate vegetable oil is a canola type of vegetable oil that expresses a high percentage of a structured triglycerol with its fatty acids arranged in a nonrandom manner. In particular, the laurate molecules are esterified at the 1 and 3 positions on the glycerol molecule, and the naturally occurring C:18 fatty acids predominate at the 2 position of the triglycerol molecule. Consequently, high laurate vegetable oil is a unique fat product in which the majority of triglycerols have an extremely symmetrical shape after appropriate hydrogenation. Additionally, proper hydrogenation of a high laurate vegetable oil gives a hard dry fat at room temperature which melts at slightly higher than room temperature in a relatively narrow and sharp range (predominately because of its nonrandom structure) making it an ideal candidate for use in encapsulation processes. Furthermore, the use of high laurate vegetable oil as a coating in an encapsulate, because of its narrow melting range caused by a relatively high degree of hydrogenation, results in an encapsulated ingredient with good flowability characteristics (i.e. no binding, blocking, smearing, caking or doughing up). Furthermore, certain substrates which can be difficult to encapsulate can be more easily and more tightly encapsulated with high laurate vegetable oils, as compared with conventional vegetable oil products, thereby preventing leakage of the substrate and allowing for improved protection of the substrate.

The first step in the encapsulation process is to melt the high laurate vegetable oil since, as described above, it is a hard dry fat at room temperature. Concurrently, the substrate or ingredient to be encapsulated is introduced into a fluidized bed reactor. While the use of a fluidized bed reactor is herein described for the encapsulation process, those skilled in the art will realize that other encapsulation processes such as spray drying, spray chilling, spinning disk and coacervation may be used. The air flow passing through the reactor is adjusted so that the particles are slightly levitated. The liquidized and free flowing high laurate vegetable oil is then sprayed over the ingredient in the fluidizied bed reactor, thereby encapsulating it. The fluidized air levitating the ingredient is cooled, thereby causing the fat to solidify and encapsulate the ingredient. After the desired amount of coating is applied, the encapsulated ingredient is then removed from the fluidized bed reactor, sifted for size, and packaged under appropriate conditions to protect the encapsulated ingredient, normally a polyethylene lined cardboard container.

In a preferred embodiment of the invention, lactic acid, which has a melting point of around 131° F. and which is particularly difficult to encapsulate using conventional vegetable oil products, is encapsulated with a high laurate vegetable oil. Lactic acid, being a liquid, is first applied to a carrier such as calcium lactate and converted to a dry solid form. The lactic acid and calcium lactate combination is then introduced into the fluidized bed reactor. Melted high laurate vegetable oil is then sprayed into the fluidized bed reactor and it encapsulates the lactic acid. The high laurate vegetable oil gives a tight seal around the lactic acid due to the lower batch temperature required, thereby preventing leaks of the lactic acid from the encapsulate. As would be expected, any premature leaks into the food system will cause a premature lowering of the pH and have an adverse effect on the food process and product.

The encapsulated ingredient can be used in a variety of food systems. For example, encapsulated lactic acid can be used in the production of low temperature sausage products. Because of the tight seal of the encapsulated acid, premature leakage of the acid, which would cause an unpalatable product, will not occur. The relatively low melting point of the coating resulting from encapsulating with high laurate vegetable oil allows the active ingredient (or substrate) to be released at a much lower temperature range (100°–110° F.) than encapsulates with conventional hydrogenated vegetable oil based coatings such as soybean oil (158° F.–160° F.), cottonseed oil (145° F.–150° F.), or palm oil (130° F.–135° F.). For instance, with high laurate vegetable oil, the functional ingredient or substrate in the encapsulate can be released during the proofing stage in a dough system.

In another preferred embodiment of the invention, biologically active materials, such as enzymes and microorganisms, are encapsulated with a high laurate vegetable oil. A dry form of the biologically active material (e.g. *Lactobacillus acidophilus*) is introduced into the fluidized bed reactor as the substrate for encapsulation. Melted high laurate vegetable oil kept slightly above its melting point is in turn sprayed into the fluidized bed reactor to encapsulate the biologically active material. The biological activity of the substrate is effectively preserved since the process temperature using the low-melt technology described can be much lower (e.g. 90–100° F.) than the critical temperature of inactivation. The preservation of biological activity of the substrate is further assured as the process described can accurately control the air flow without introducing additional moisture. Shelf life and storage stability of the encapsulated bioactive materials are effectively extended compared to unencapsulated substrates. The encapsulated bioactives are used for their health benefits or as process aids in food or agricultural systems.

BRIEF DESCRIPTION OF THE DRAWINGS

FIG. 2 is a table illustrating the onset and offset temperatures of several vegetable oil products.

DETAILED DESCRIPTION OF THE PREFERRED EMBODIMENTS

Figure 1:
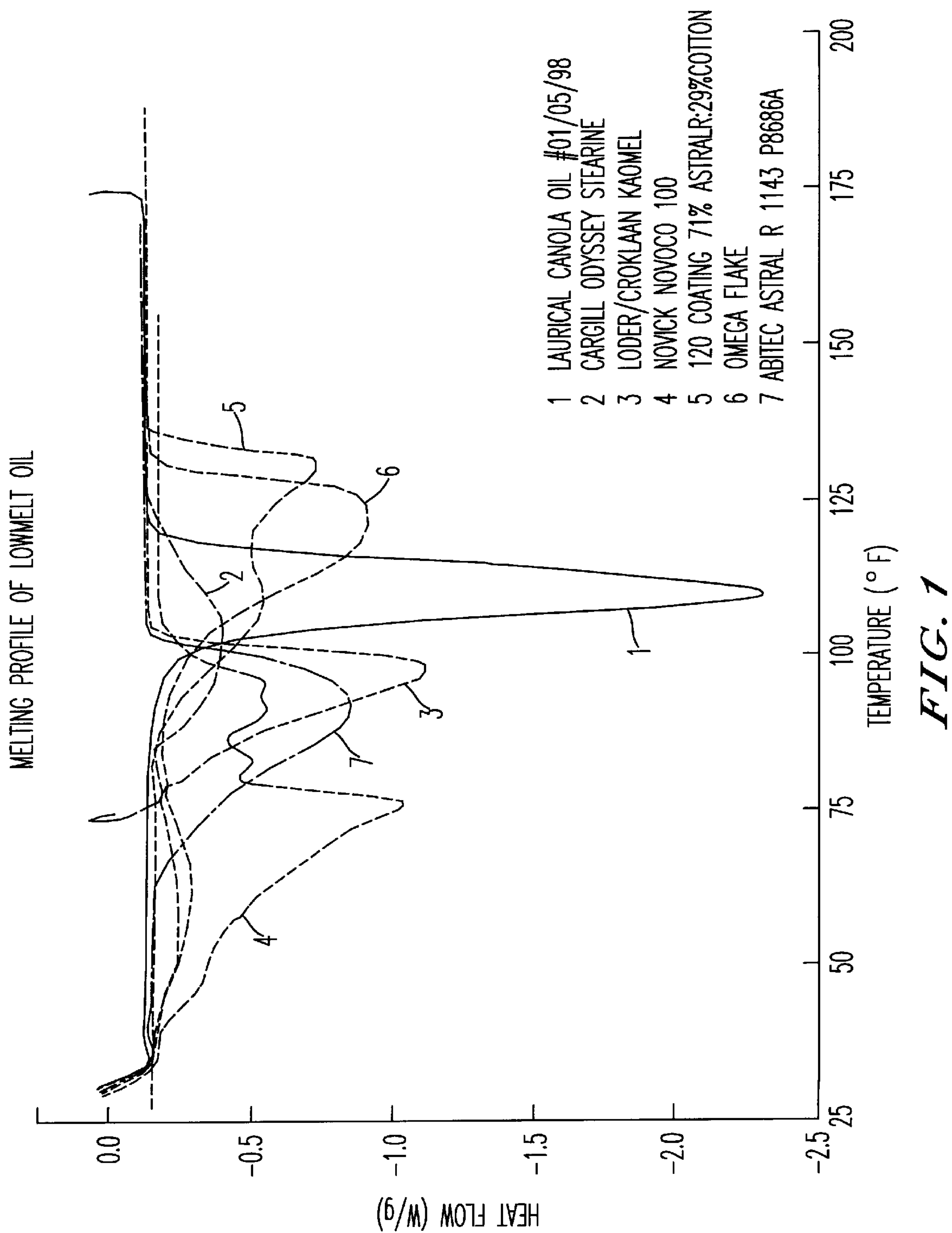
FIG. 1 is a Differential Scanning Calorimeter (DSC) curve for a high laurate vegetable oil and several conventional vegetable oil products.

Production of High Laurate Vegetable Oil Encapsulates

As previously mentioned, there are several methods which may be used to encapsulate ingredients. The present invention will be described in connection with the fluidized bed coating process, but one of ordinary skill in the art will appreciate that the present invention may also be practiced utilizing the encapsulation processes of spray drying, spray chilling, spinning disk, and coacervation.

Using the fluidized bed coating method, the substrate to be encapsulated is introduced into the fluidized bed, and the air flow passing through the reactor is adjusted so that the substrate particles become slightly levitated. High laurate vegetable oil is melted by heating it to around 110 to 135° F. This temperature is appreciably lower than used when encapsulating ingredients with conventional hydrogenated vegetable oils such as soybean and cottonseed. The liquidized and free flowing high laurate vegetable oil is sprayed into the fluidized bed chamber, which is kept at around 80 to 130° F. depending on the substrates which are being encapsulated, and the high laurate vegetable oil covers the substrate particles located in the fluidized zone. After the desired amount of high laurate vegetable oil is applied, the fluidized air levitating the ingredient is cooled, thereby causing the high laurate vegetable oil to solidify and encapsulate the ingredient. The encapsulated substrate is then removed from the fluidized bed reactor, sifted for size, and packaged under appropriate conditions to protect the encapsulated substrate.

The use of high laurate vegetable oil as an encapsulation coating has many advantages over the use of other hydrogenated vegetable oils even though they may have similar reported melting points. These advantages manifest themselves both in the process of encapsulating a substrate, and thereafter in the use of that substrate or ingredient in a food system.

As described above, in the encapsulation process itself, temperature sensitive materials can be encapsulated with high laurate vegetable oil at lower temperatures than if conventional hydrogenated vegetable oil products were used. Additionally, because of the unique melting and crystallization characteristics of high laurate vegetable oils, the optimum batch temperature in the fluidized bed reactor while encapsulating with high laurate vegetable oils is much lower than batch temperatures while encapsulating with conventional hydrogenated vegetable oil products. Consequently, spraying of the coating melt (i.e. high laurate vegetable oil) can start sooner as the lower optimum batch temperature is reached sooner (e.g. 90° F.) than it is reached when encapsulating a batch with conventional hydrogenated vegetable oil products like soybean or cottonseed where in general spraying starts after the batch temperature exceeds 120° F. In the case of encapsulating lactic acid, a substrate particularly difficult to encapsulate with soybean or cottonseed oil due to constant smearing if heated to 120° F., the alternative approach is to keep the batch temperature low and spray soybean or cottonseed oil at a low temperature range, which can sacrifice the tightness of the encapsulate significantly since the cooler temperature is too close to the freezing temperature (i.e. the temperature the coating starts to solidify) of the hydrogenated soybean or cottonseed oils which causes these oils to significantly lose their film-forming capability. On the contrary, optimum encapsulation of lactic acid can be achieved using high laurate vegetable oil since the coating melt can retain maximum film forming capability at a lower temperature for the lower batch temperature. The total encapsulation time in general can be reduced using high laurate vegetable oils since the optimum batch temperature is reached sooner (90° F.), and the operator will not have to wait as long as encapsulating with the hydrogenated soybean or cottonseed oils. Moreover, the lower temperatures (110–135° F.) associated with the high laurate vegetable oils reduce smearing, caking, doughing up, and other handling problems that can be associated with encapsulates when more difficult substrates such as lactic acid are to be encapsulated. Consequently, a smaller quantity of flow agents is needed with high laurate vegetable oils. All of these factors result in a tighter encapsulation with the high laurate vegetable oil than with conventional hydrogenated vegetable oil products, which means less leakage of the substrate from the encapsulation. In the case of encapsulating lactic acid, there will be reduced lactic acid separation and/or smearing. Moreover, because of the sharp melting point and fatty acid profile of the high laurate vegetable oils, the encapsulate is crisp and free flowing and experiences no binding or blocking during packaging.

The unique characteristics of a high laurate vegetable oil can be illustrated in part by comparing the DSC (Differential Scanning Calorimeter) curves of a high laurate vegetable oil with those of vegetable-oil-based commercial products. For example, the DSC curve in FIG. 1 illustrates the differences between an appropriately hydrogenated high laurate vegetable oil, i.e. high laurate canola oil (Laurical® from Calgene which has been hydrogenated), and conventional vegetable oil products such as Odyssey Stearine (Cargill), Loders Croklaan Kaomel, Omega Flake (C&T Quincy), Novick Novoco 100, AC Humko Astral R, and a blend which shows a melting point around 120° F. All these vegetable-oil-based commercial oil products have been reported with melting points close to 100–120° F. that is a typical "low-melt" range for encapsulation, yet the conventional oils exhibit many shortcomings as explained above when used in an encapsulation process.

FIG. 1 also illustrates the onset and offset of each particular oil. The onset is when the fat begins to liquify, and the offset is when the fat is completely liquified. The difference between the offset and onset of each oil of FIG. 1 is listed in FIG. 2. In the case of the high laurate vegetable oil, the onset and offset occur over a very narrow range. This narrow range is what gives the high laurate vegetable oil its unique and conducive characteristics for encapsulation processes. The other conventional vegetable-oil-based products have a much broader range between the onset and offset, and this broad range contributes to the problems one can have using these vegetable oils in encapsulation processes.

Figure 3:
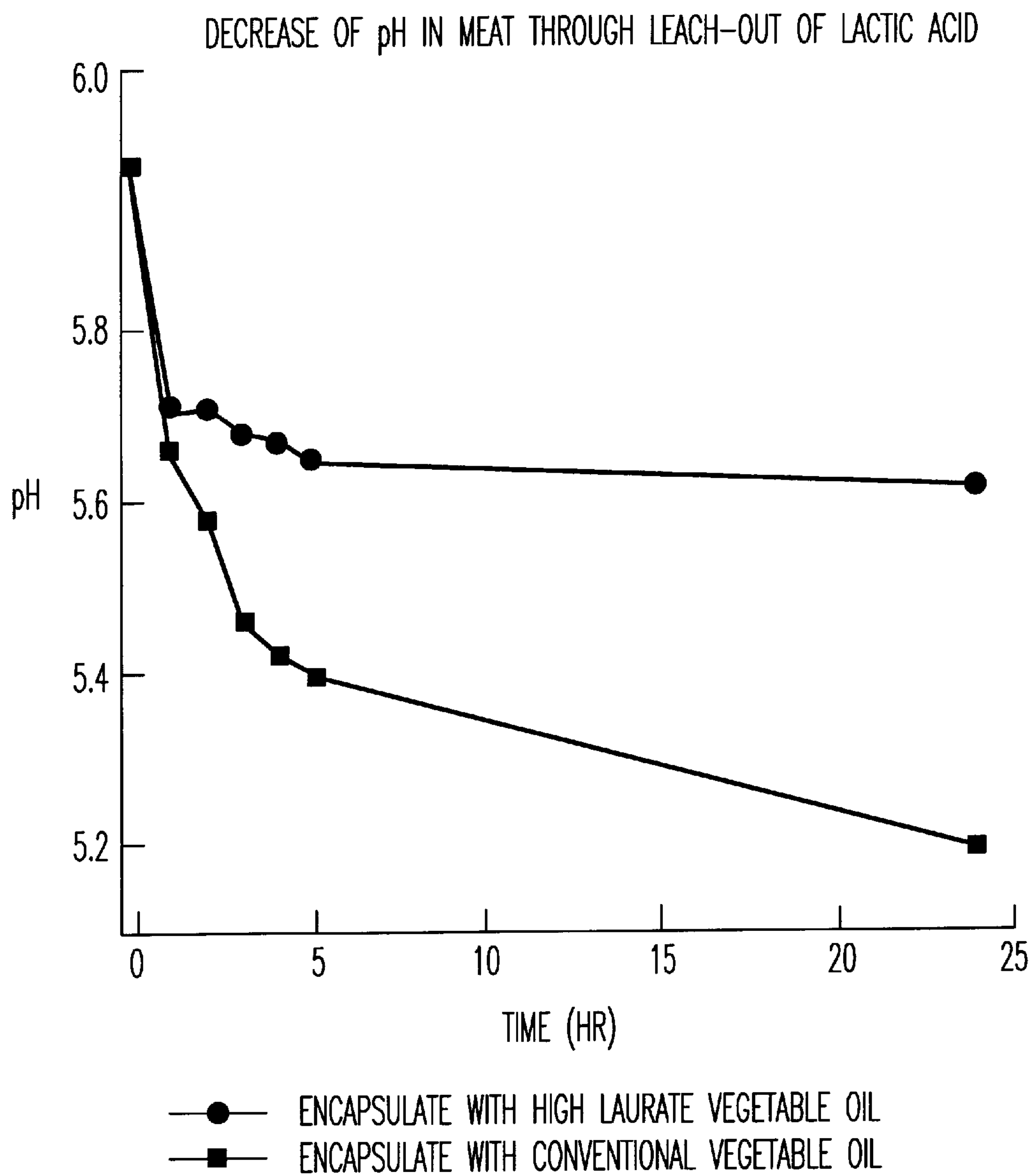
FIG. 3 is a graph illustrating an effect of the tighter encapsulation achieved with a high laurate vegetable oil as compared to a conventional vegetable oil product.

The tighter encapsulation resulting from the laurate vegetable oil process of the present invention is further illustrated in FIG. 3. FIG. 3 illustrates a decrease in pH of a ground meat batter in time after encapsulated lactic acid, but no heat, is added thereto. In one instance, the lactic acid is encapsulated with partially hydrogenated cottonseed oil, and the pH of the meat decreases from approximately 6 at time 0 to about 5.2 after 25 hours. Since no heat was added to the meat batter, the drop in pH is likely the result of leakage of lactic acid from the encapsulate rather than a disintegration of the encapsulate. In another instance, lactic acid is encapsulated with high laurate vegetable oil as disclosed by the present invention. While there is an initial drop in pH from 6 to 5.7 (which is thought to result from extraneous lactic acid on the outside of the encapsulates), the pH remains relatively stable after the initial drop indicating that there is no leakage of lactic acid from the encapsulate since the high laurate vegetable oil forms a much tighter encapsulate.

The use of high laurate vegetable oil in an encapsulation coating also permits the encapsulation process to decrease the coating to substrate ratio as compared to when typical hydrogenated vegetable oil products are used and thus allows a higher active encapsulate.

Use of High Laurate Vegetable Oil Encapsulated Lactic Acid in Dry or Semi-Dry Sausage Manufacture As explained in the Background and Summary sections, acidified meats, such as dry or semi-dry sausage, are prepared in part through the introduction into the meat emulsion of an acid to lower the pH. Historically the acid was introduced through the gradual conversion of simple sugars such as dextrose into acid through the action of lactic acid bacteria (i.e. lactic acid fermentation), with later attempts of direct acid addition, especially encapsulated acid addition. In certain cases, lactic acid is favored over other organic acids due to its natural flavor profile that is the closest to sausage made with lactic acid fermentation. However, use of the prior art hydrogenated vegetable oil products such as hydrogenated soybean, cottonseed, and palm oils as encapsulating coatings for lactic acid poses some problems because of their high melting point range which results in a high-leach lactic acid encapsulate as described previously and can lead to texture defects in sausage products.

To begin the process, the meat is ground to the proper particle size and mixed with added fat. After grinding, the meat-fat mixture is combined with water, salt, curing agents, spices, herbs, sugar, and other dry ingredients, with the exception of the encapsulated acid (usually lactic acid or citric acid). The pH of the meat should be determined at this point, and in most cases it will be approximately 5.7 to 6.2. After determining the starting pH, sufficient encapsulated acid is added to bring the pH level close to the desired level for the particular product which in general is around pH 4.9 to 5.0. As a example, if the encapsulated acid is lactic acid, one may use 1–2% of encapsulated lactic acid per hundred weight of meat. The actual usage level will depend upon the activity level of the lactic acid in the encapsulate. Because the grinding and mixing of the meat-fat mixture and the balance of the ingredients can damage or destroy the encapsulated coating, the encapsulated acid should be added at the end of the grinding-mixing stage. The temperature of the meat mixture during the grinding and mixing stage is around refrigeration or freezer temperatures. The meat is then stuffed into the sausage casing, and placed in a smokehouse for heat treatment and smoking as is well known in the art.

Use of High Laurate Vegetable Oil to Encapsulate Biologically Active Substrates

As mentioned in the Background and Summary sections, live cultures of microorganisms, such as *Lactobacillus acidophilus*, are used in humans and animals to establish a beneficial microflora in the digestive tract. The live culture, therefore, will retain its maximum activity if the culture is protected against the harsh (i.e. strongly acidic) gastric environment by encapsulation. In addition, the live culture is rather sensitive to certain environmental factors during storage, such as moisture and temperature. Encapsulating the live microorganisms will improve their stability against undesirable environmental factors since the live microorganisms are protected from atmospheric gas and moisture by the inert coating used in the encapsulation process.

To encapsulate a live microorganism, one starts by introducing a dry form of the live culture, such as freeze-dried culture, into the fluidized bed reactor. The culture is then sprayed with melted hydrogenated high laurate vegetable oil at a batch temperature no higher than 100° F. using the process previously described. Encapsulated particles containing live culture are produced after the spraying and cooling stages, and then sifted for size. The encapsulated culture is in turn packaged for appropriate applications, such as in a gel capsule for direct ingestion or to be blended in drink or dietary mix.

Although the present invention has been described in terms of several specific preferred embodiments, it will be appreciated after having read the above description that many alterations and modifications of the invention will no doubt become apparent to those of ordinary skill in the art. Accordingly, it is intended that the disclosure be considered as exemplary rather than limiting, and that the appended claims be interpreted as covering all such alterations and modifications that fall within the true spirit and scope of the invention.

What is claimed is:

1. An encapsulated substrate comprising:

a high laurate canola oil coating; and a substrate contained within said high laurate canola oil coating, wherein the encapsulated substrate yields less leakage of the substrate than said substrate coated with a hydrogenated vegetable oil that is not a high laurate canola oil.

2. An encapsulated substrate according to claim 1, wherein said substrate is an ingredient for use in a food system.

3. The encapsulated substrate according to claim 2, where said ingredient is lactic acid.

4. The encapsulated substrate according to claim 3, wherein said lactic acid is plated onto a calcium lactate carrier.

5. The encapsulated substrate according to claim 3, wherein said encapsulated lactic acid is used in the preparation of sausage.

6. The encapsulated substrate according to claim 1, wherein said substrate is a biologically active substance.

7. The encapsulated substrate according to claim 6, wherein said biologically active substance is a microorganism.

8. The encapsulated substrate according to claim 6, wherein said biologically active substance is an enzyme.

9. A process of making a low melt encapsulate, comprising the steps of:

selecting a high laurate canola oil for use as a coating material;

melting said high laurate canola oil;

selecting a substrate to be encapsulated; and encapsulating said substrate with said high laurate canola oil, wherein the encapsulated substrate yields less leakage of the substrate than said substrate coated with a hydrogenated vegetable oil that is not a high laurate canola oil.

10. A process for making a low melt encapsulate according to claim 9, wherein said substrate is an ingredient to be used in a food system.

11. A process for making a low melt encapsulate according to claim 10, wherein said ingredient is lactic acid to be used in the making of sausage.

12. A process for making a low melt encapsulate according to claim 9, wherein the step of encapsulating comprises the steps of:

introducing said substrate into a fluidized bed reactor;

spraying said melted high laurate canola oil into said fluidized bed reactor, thereby encapsulating said substrate with said high laurate canola oil; and removing said encapsulated substrate from said fluidized bed reactor.

13. A process making low temperature meat products, comprising the steps of:

selecting a meat base;

adding to said meat base salt, sugar, and curing ingredients;

mixing said salt, sugar, and curing ingredients into said meat base;

adding to said meat base an encapsulate comprising lactic acid coated with a high laurate canola oil, wherein the encapsulate yields less leakage of lactic acid than said lactic acid coated with a hydrogenated vegetable oil that is not a high laurate canola oil; and raising said mixture to a temperature at which the encapsulate will gradually release the lactic acid into the meat mixture.

14. A process for making a low melt encapsulate, comprising the steps of:

selecting a substrate; and coating said substrate with a high laurate canola oil;

wherein said coating step is a process selected from the group consisting of spray drying, spray chilling, spinning disk, and coacervation, and wherein the encapsulated substrate yields less leakage of the substrate than said substrate coated with a hydrogenated vegetable oil that is not a high laurate canola oil.

15. An encapsulated substrate according to claim 1, wherein said high laurate canola oil comprises a three carbon glycerol backbone, and further wherein said laurate is attached to carbons 1 and 3 of said glycerol backbone.

16. An encapsulated substrate according to claim 1, wherein said high laurate canola oil has a melting point in the range of about 100° F. to 110° F.

17. An encapsulated substrate according to claim 1, wherein said high laurate canola oil is hydrogenated.

18. An encapsulated substrate comprising:

a high laurate canola oil coating; and a nonacidulant substrate contained within said high laurate canola oil coating, wherein the encapsulated substrate yields less leakage of the substrate than said substrate coated with a hydrogenated vegetable oil that is not a high laurate canola oil.

19. An encapsulated substrate comprising:

a high laurate canola oil coating; and a biologically active substance within said high laurate canola oil coating, wherein the encapsulated substrate yields less leakage of the substrate than said substrate coated with a hydrogenated vegetable oil that is not a high laurate canola oil.

20. An encapsulated substrate comprising:

a high laurate canola oil coating; and a microorganism contained within said high laurate canola oil coating, wherein the encapsulated substrate yields less leakage of the substrate than said substrate coated with a hydrogenated vegetable oil that is not a high laurate canola oil.

21. An encapsulated substrate comprising:

a high laurate canola oil coating; and an enzyme contained within said high laurate canola oil coating, wherein the encapsulated substrate yields less leakage of the substrate than said substrate coated with a hydrogenated vegetable oil that is not a high laurate canola oil.

22. An encapsulated substrate according to claim 1, wherein said high laurate canola oil coating comprises more than 25% lauric acid.

* * * * *